(12) United States Patent
Janlert

(10) Patent No.: US 8,348,071 B1
(45) Date of Patent: Jan. 8, 2013

(54) ADJUSTABLE AIR HANDLER STAND AND FILTER RACK

(76) Inventor: Perez Janlert, Miami Gardens, FL (US)

(*) Notice: Subject to any disclaimer, the term of this patent is extended or adjusted under 35 U.S.C. 154(b) by 665 days.

(21) Appl. No.: 11/968,791

(22) Filed: Jan. 3, 2008

Related U.S. Application Data

(60) Provisional application No. 60/947,650, filed on Jul. 2, 2007.

(51) Int. Cl.
*A47F 5/00* (2006.01)
*A47B 43/00* (2006.01)
*F16M 11/00* (2006.01)

(52) U.S. Cl. ............... 211/175; 211/189; 248/163.1

(58) Field of Classification Search ............ 211/189, 211/207, 190, 13.1, 175, 208, 195; 248/670, 248/188.2, 188.5, 163.1; 108/147.21, 106, 108/147.16
See application file for complete search history.

(56) References Cited

U.S. PATENT DOCUMENTS

| | | | |
|---|---|---|---|
| 2,587,469 A * | 2/1952 | Herring | 108/116 |
| 2,805,776 A * | 9/1957 | Levitin | 211/27 |
| 3,523,702 A * | 8/1970 | Unti et al. | 403/107 |
| 5,107,775 A * | 4/1992 | Langlais et al. | 108/147.21 |
| 5,241,948 A * | 9/1993 | Thibodeau | 126/25 R |
| 5,308,037 A * | 5/1994 | Gonzalez | 248/670 |
| 5,407,171 A * | 4/1995 | Gonzalez | 248/670 |
| 5,533,704 A | 7/1996 | Fischinger | |
| 6,796,890 B1 * | 9/2004 | Goldrick | 451/454 |
| 2004/0129844 A1 * | 7/2004 | Doyle | 248/188.8 |
| 2004/0178306 A1 * | 9/2004 | Hallberg | 248/188.5 |
| 2004/0194678 A1 * | 10/2004 | Waner | 108/147.21 |
| 2005/0044829 A1 | 3/2005 | Chase | |
| 2007/0145205 A1 * | 6/2007 | Liang | 248/163.1 |
| 2008/0001462 A1 * | 1/2008 | Holland | 297/440.1 |
| 2009/0250571 A1 * | 10/2009 | Laws | 248/188.5 |

* cited by examiner

*Primary Examiner* — Joshua J Michener
*Assistant Examiner* — Devin Barnett
(74) *Attorney, Agent, or Firm* — Albert Bordas, P.A.

(57) ABSTRACT

A base assembly for air handlers having a filter. Four metallic legs each have a distal end. The metallic legs also have first through holes at first predetermined distances from their respective distal ends. The metallic legs have a rectangular or square cross section, and each distal end mounts to a floor. First and second metallic upper frames have vertical extensions to telescopically receive the four metallic legs respectively. The first and second metallic upper frames further have braces member and air filter C-shaped tracks. The first and second metallic upper frames each further have elongated male horizontal arms and elongated female horizontal arms that join whereby the air filter C-shaped tracks face each other to receive a filter.

2 Claims, 2 Drawing Sheets

ADJUSTABLE AIR HANDLER STAND AND FILTER RACK

CROSS REFERENCE TO RELATED APPLICATIONS

This application claims priority to provisional U.S. patent application Ser. No. 60/947,650 filed Jul. 2, 2007.

STATEMENT REGARDING FEDERALLY RELATED RESEARCH OR DEVELOPMENT

Applicant states that no federal funding was involved directly or indirectly in the research and development of the object of the present invention.

BACKGROUND OF THE INVENTION

1. Field of the Invention

The present invention relates to air conditioning equipment, and more specifically, to base assemblies for air handlers having a filter.

2. Description of the Related Art

Applicant believes that the closest reference corresponds to Gonzalez U.S. Pat. No. 5,407,171 and entitled "Adjustable Air Handler Base Assembly". However, it differs from the present invention because it does not provide additional features required by an air handler, i.e. double adjustable screw both for the height and for the lateral size.

The invention disclosed in the patent to Gonzalez fails to disclose the horizontal support members for each side of the assembly. In addition to that, it does not mention or suggest a vertical adjustability, claimed in this invention.

Other patents describing the closest subject matter provide for a number of more or less complicated, and expensive features that fail to solve the problem in an efficient and economical way. None of these patents suggests the novel features of the present invention.

SUMMARY OF THE INVENTION

It is one of the main objects of the present invention to provide a base assembly for air handlers having a filter that can be adapted to keep the latter suspended at a spaced apart separation from the ground to permit the air to flow in.

It is an object of the present invention to provide base assembly for air handlers having a filter that is sturdy and capable to support heavy air handlers.

It is still another object of this invention to provide an base assembly for air handlers having a filter that fits most air handler units with disregard to the manufacturing entity.

Another object of this invention is to provide a filter track that facilitates the replacement of filters when the track is not a built-in feature of the air handler.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Present invention 10 is a base assembly for air handlers having a filter. It basically comprises metallic legs 20, first metallic upper frame 40, and second metallic upper frame 70.

Figure 1:
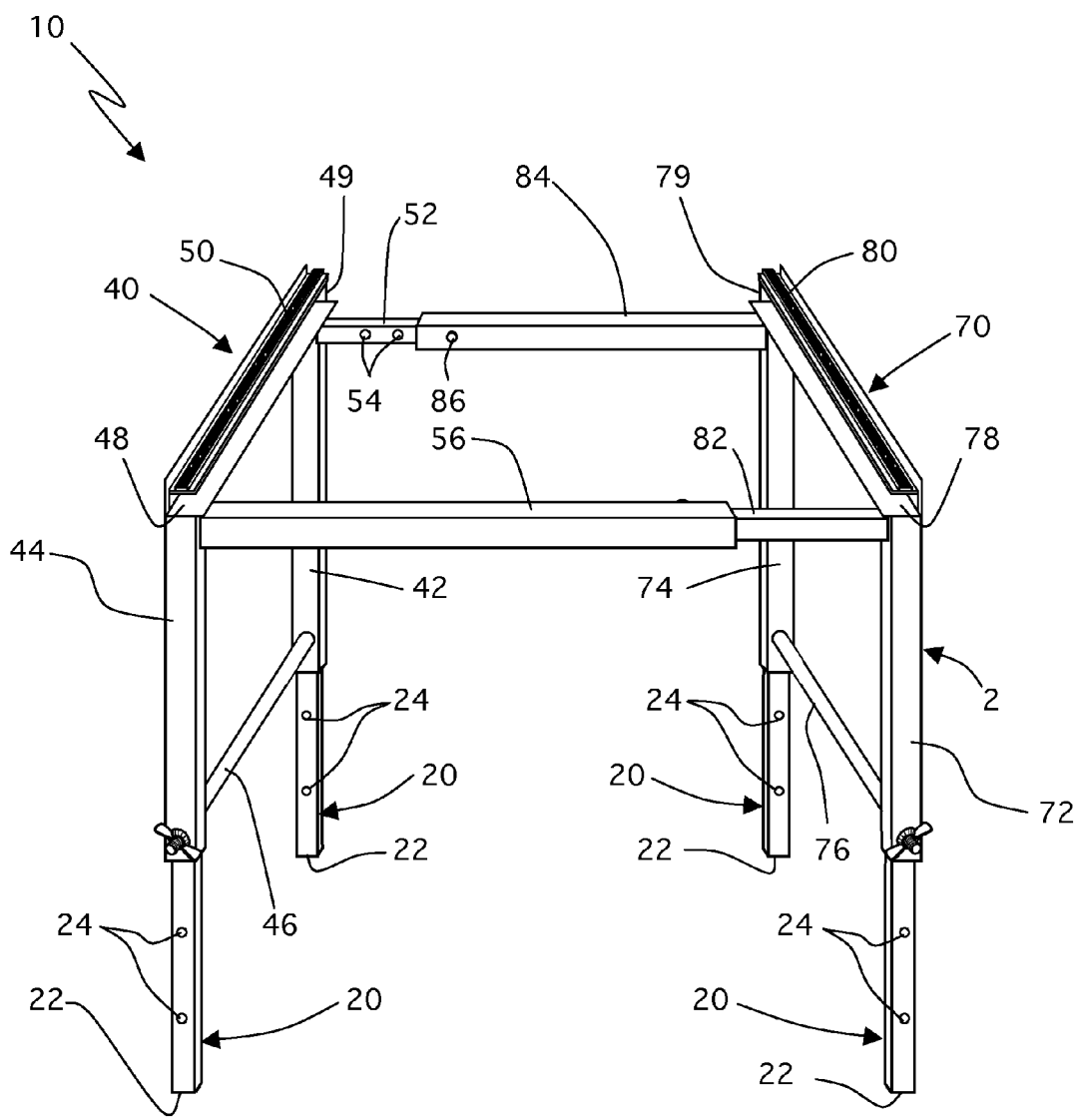
FIG. 1 is an isometric view of the present invention.
Figure 2:
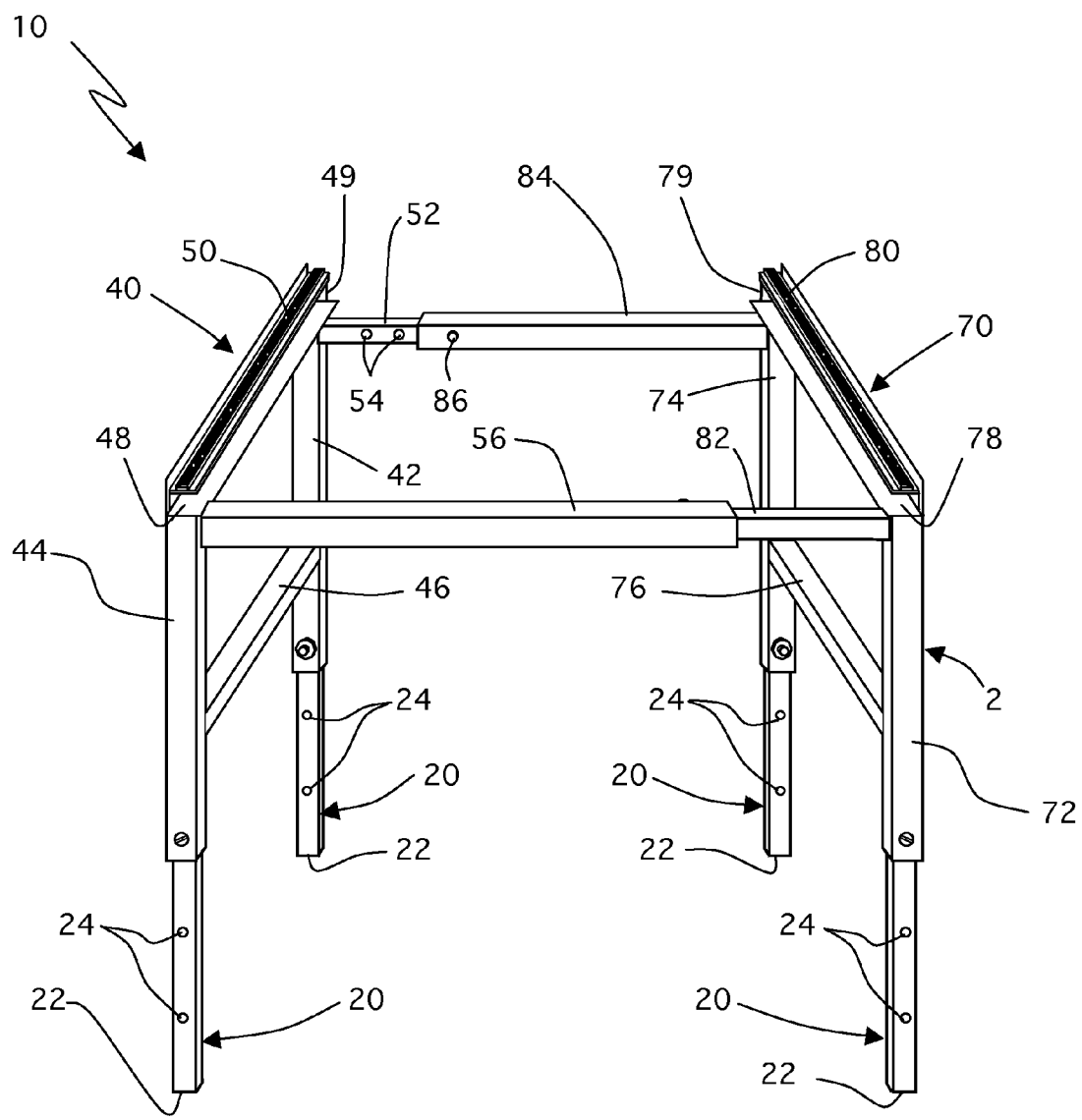
FIG. 2 is an isometric view of an alternate embodiment of the present invention.

As seen in FIGS. 1 and 2, metallic legs 20 each have distal end 22. Each metallic legs 20 also has first through holes 24 at first predetermined distances from each distal end 22. Metallic legs 20 having a rectangular or square cross section, and each distal end 22 mounts to a floor.

First metallic upper frame 40 comprises first and second vertical extensions 42 and 44 to telescopically receive a first set of metallic legs 20 respectively. First metallic upper frame 40 further comprises first brace member 46 extending between first and second vertical extensions 42 and 44. First metallic upper frame 40 further comprises first air filter C-shaped track 48 extending between first and second vertical extensions 42 and 44. Stopper 49 is at one end of air filter C-shaped track 48. First air filter C-shaped track 48 comprises a first vibration absorbing strip material 50. First metallic upper frame 40 further comprises first elongated male horizontal arm 52 that is perpendicular to first vertical extension 42. First elongated male horizontal arm 52 comprises second through holes 54 at second predetermined distances. First metallic upper frame 40 further comprises first elongated female horizontal arm 56 that is perpendicular to second vertical extension 44.

Second metallic upper frame 70 comprises third and fourth vertical extensions 72 and 74 to telescopically receive a second set of metallic legs 20 respectively. Second metallic upper frame 70 further comprises second brace member 76 extending between third and fourth vertical extensions 72 and 74. Second metallic upper frame 70 further comprises second air filter C-shaped track 78 extending between third and fourth vertical extensions 72 and 74. Stopper 79 is at one end of air filter C-shaped track 78. Second air filter C-shaped track 78 comprising second vibration absorbing strip material 80. Second metallic upper frame further 70 comprises second elongated male horizontal arm 82 that is perpendicular to third vertical extension 72. Second metallic upper frame 70 further comprises second elongated female horizontal arm 84 that is perpendicular to fourth vertical extension 74. Second elongated female horizontal arm 84 comprises third through holes 86 at third predetermined distances. Second elongated female horizontal arm 84 telescopically receives first elongated male horizontal arm 52 and first elongated female horizontal arm 56 telescopically receives second elongated male horizontal arm 82 whereby first and second air filter C-shaped tracks 48 and 78 face each other to receive a filter. First and second air filter C-shaped tracks 48 and 78 are designed to receive a conventional air filter, not seen, typically used in connection with the operation of an air handler that requires periodic filter removal and changing.

First and second vibration absorbing strip materials 50 and 80 minimize vibrations to instant invention 10, and prevent a flow of heat and/or electricity to pass through instant invention 10.

Pins, bolts and nuts, and/or screws may be secured within first, second, or third through holes 24; 54; and 86 respectively to adjust to a desired height and/or width of instant invention 10 to have an air handler mounted thereon.

In a preferred embodiment, first through holes 24 are threaded.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A base assembly for air handlers having a filter, consisting of:
    A) four metallic legs, each having a distal end, each of said metallic legs also has first through holes at first predetermined distances from said distal end, said metallic legs having a rectangular or square cross section, each said distal end mounts to a floor, said first through holes are threaded;
    B) a first metallic upper frame comprising first and second vertical extensions to telescopically receive a first set of said four metallic legs respectively, said first metallic upper frame further comprising a first brace member extending between said first and second vertical extensions, said first metallic upper frame further comprising a first air filter C-shaped track extending between said first and second vertical extensions, said first air filter C-shaped track comprising a first vibration absorbing strip material and a first stopper, said first metallic upper frame further comprising a first elongated male horizontal arm that is perpendicular to said first vertical extension, said first elongated male horizontal arm comprises second through holes at second predetermined distances, said first metallic upper frame further comprising a first elongated female horizontal arm that is perpendicular to said second vertical extension; and
    C) a second metallic upper frame comprising third and fourth vertical extensions to telescopically receive a second set of said four metallic legs respectively, said second metallic upper frame further comprising a second brace member extending between said third and fourth vertical extensions, said second metallic upper frame further comprising a second air filter C-shaped track extending between said third and fourth vertical extensions, said second air filter C-shaped track comprising a second vibration absorbing strip material and a second stopper, said second metallic upper frame further comprising a second elongated male horizontal arm that is perpendicular to said third vertical extension, said second metallic upper frame further comprising a second elongated female horizontal arm that is perpendicular to said fourth vertical extension, said second elongated female horizontal arm comprises third through holes at third predetermined distances, said second elongated female horizontal arm telescopically receives said first elongated male horizontal arm and said first elongated female horizontal arm telescopically receives said second elongated male horizontal arm whereby said first and second air filter C-shaped tracks face each other to receive a filter, and said first and second stoppers contain said filter, said first and second vibration absorbing strip material minimize vibrations and prevent a flow of heat to pass through said first and second metallic upper frames, further characterized in that at least one of pins, bolts, nuts, and screws are configured to be secured within said first, second, or third through holes to adjust to at least one of a desired height and a desired width of said four metallic legs and said first and second metallic upper frames to have an air handler mounted thereon.

2. The base assembly for air handlers having a filter set forth in claim 1, further characterized in that said first and second vibration absorbing strip material prevent a flow of electricity to pass through said first and second metallic upper frames.

\* \* \* \* \*